United States Patent [19]
Wisor et al.

[11] Patent Number: 5,504,910
[45] Date of Patent: Apr. 2, 1996

[54] POWER MANAGEMENT UNIT INCLUDING SOFTWARE CONFIGURABLE STATE REGISTER AND TIME-OUT COUNTERS FOR PROTECTING AGAINST MISBEHAVED SOFTWARE

[75] Inventors: Michael T. Wisor; Rita M. O'Brien, both of Austin, Tex.

[73] Assignee: Advanced Micro Devices, Inc., Sunnyvale, Calif.

[21] Appl. No.: 190,279

[22] Filed: Feb. 2, 1994

[51] Int. Cl.$^6$ .................................................. G06F 1/32
[52] U.S. Cl. ...................... 395/750; 364/707; 364/273.1; 364/273.2; 364/273.3; 364/264; 364/264.6; 364/247; 364/DIG. 1
[58] Field of Search .................................. 395/750, 550, 395/775, 800; 364/707; 365/227; 377/16

[56] References Cited

U.S. PATENT DOCUMENTS

| | | | |
|---|---|---|---|
| 4,317,180 | 2/1982 | Lies | 364/707 |
| 4,665,536 | 5/1987 | Kim | 364/707 |
| 4,686,386 | 8/1987 | Tadao | 327/143 |
| 5,086,387 | 2/1992 | Arroyo et al. | 395/550 |
| 5,163,153 | 11/1992 | Cole et al. | 395/750 |
| 5,167,024 | 11/1992 | Smith et al. | 395/375 |
| 5,218,704 | 6/1993 | Watts, Jr. et al. | 395/7550 |
| 5,222,239 | 6/1993 | Rosch | 395/750 |
| 5,369,771 | 11/1994 | Gettel | 395/750 |

FOREIGN PATENT DOCUMENTS

| | | |
|---|---|---|
| 0487049A1 | 11/1991 | European Pat. Off. . |
| 2235797 | 8/1990 | United Kingdom . |
| 92/21081 | 11/1992 | WIPO . |

OTHER PUBLICATIONS

"Technique For Monitoring A Computer System's Activity For The Purpose Of Power Management Of A Dos–Compatible System", *Technical Disclosure Bulletin*, (September, 1990), vol. 33, No. 4, pp. 474–477.

"Technique For Power Management In Signal Processors", *Technical Disclosure Bulletin*, (October 1992), vol. 35, No. 5, pp. 425–427.

*Primary Examiner*—Gopal C. Ray
*Attorney, Agent, or Firm*—B. Noel Kivlin

[57] ABSTRACT

A power management unit including a set of time-out counters and a software configurable state register is provided for managing power consumption within a computer system. Depending upon the state of the power management unit, a power control unit and a clock control unit are configured such that power may be applied or removed from certain components of the computer system and such that the frequencies of a CPU clock signal and a system clock signal may be raised or lowered. The power management unit includes a software configurable state register which allows system software, such as APM responsive software within the system BIOS, to control the state of the power management unit. When the power management unit is in a ready state during which the CPU clock signal and the system clock signal are driven at maximum frequencies and during which power is applied to all component components, a time-out counter is activated to begin a first count down period. A system monitor monitors various circuit portions of the computer system during this period, and, if certain system activity is not detected, the power management unit enters a doze state upon lapse of the time-out counter. During the doze state, the frequencies of the CPU clock signal and the system clock signal are reduced and/or power is removed from selected inactive circuit portions.

14 Claims, 2 Drawing Sheets

POWER MANAGEMENT UNIT INCLUDING SOFTWARE CONFIGURABLE STATE REGISTER AND TIME-OUT COUNTERS FOR PROTECTING AGAINST MISBEHAVED SOFTWARE

BACKGROUND OF THE INVENTION

1. Field of the Invention

This invention relates to computer systems and more particularly to power management units and techniques employed within computer systems.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMUs). One specific power reduction technique involves the capability of stopping clock signals that drive inactive circuit portions. A system employing such a technique typically involves a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical, and another technique involves the capability of removing power from inactive circuit portions.

A software standard that employs the above-described power reduction techniques is known as the Advanced Power Management (APM) software standard. Computer systems that accommodate APM software allow the operating system to initiate idle calls to determine whether various application programs are busy or idle. In response to an idle call from the operating system, a given application program returns an idle indication to the operating system if it is idle. If all the application programs loaded within the system indicate that they are idle, the operating system passes the all-idle indication to the system BIOS which, for example, may cause the frequencies of selected clock signals to be reduced and/or power to be removed from selected inactive circuit portions. If any of the application programs thereafter becomes active (as determined by subsequent polling by the operating system), the system BIOS causes the frequencies of the clock signals to return to their normal levels and/or causes power be reapplied to the various circuit portions.

A problem encountered in systems that employ the advanced power management software standard occurs when so-called "misbehaved" software is loaded as an application program within the system. Misbehaved software is software that is incompatible with or that does not recognize the Advanced Power Management software standard. Thus, when the operating system polls the misbehaved software to determine whether it is busy or idle, the misbehaved software is non-responsive, and the operating system infers that it is busy. As a result, the system BIOS never causes the power management unit to reduce the frequencies of the various clock signals and never removes power from inactive circuit portions for power management even though all the application software may in fact be inactive. Accordingly, the overall power consumption of the computer system remains relatively high, and the power management system becomes ineffective.

SUMMARY OF THE INVENTION

The problems outlined above are in large part solved by a power management unit including time-out counters and a software configurable state register accordingly to the present invention. In one embodiment, a computer system is provided that includes a power switching unit for providing power to various components of the computer system such as a microprocessor and associated peripheral devices. The computer system further includes a clock generator for generating a CPU clock signal as well as a system clock signal. A power management unit is coupled to the power switching unit and the clock generator and manages the overall power consumption of the computer system. Depending upon the state of the power management unit, a power control unit and a clock control unit control the power switching unit and the clock generator, respectively, such that power may be applied or removed from certain components of the computer system and such that the frequencies of the CPU clock signal and the system clock signal may be raised or lowered. The power management unit includes a software configurable state register which allows system software, such as APM responsive software within the system BIOS, to control the state of the power management unit. Accordingly, Advanced Power Management software is accommodated for controlling the state of the power management unit. The power management unit further includes a set of time-out counters which also control the state of the power management unit. When the power management unit is in a ready state during which the CPU clock signal and the system clock signal are driven at maximum frequencies and during which power is applied to all computer components, one of the time-out counters is activated to begin a first count down period. A system monitor monitors various circuit portions of the computer system during this period, and, if certain system activity is not detected, the power management unit enters a doze state upon lapse of the time-out counter. During the doze state, the frequencies of the CPU clock signal and the system clock signal are reduced and/or power is removed from selected inactive circuit portions. Accordingly, overall power consumption of the computer system is minimized even if misbehaved software is loaded within the system.

Broadly speaking, the present invention contemplates a power management system for a computer system comprising a clock control unit for controlling the frequency of a first clock signal and a power management state machine coupled to the clock control unit. The power management state machine includes a normal state during which the clock control unit causes the first clock signal to be driven at a first frequency and a doze state during which the clock control unit causes the first clock signal to be driven at a reduced frequency (i.e., including a stopped state). A programmable register is coupled to the power management state machine and is capable of receiving a state value that controls whether the power management state machine is in the normal state or in the doze state. A first counter is further coupled to the power management state machine and is capable of causing the power management state machine to switch from the normal state to the doze state upon lapse of a first predetermined count period.

BRIEF DESCRIPTION OF THE DRAWINGS

Other objects and advantages of the invention will become apparent upon reading the following detailed description and upon reference to the accompanying drawings in which.

Figure 1:
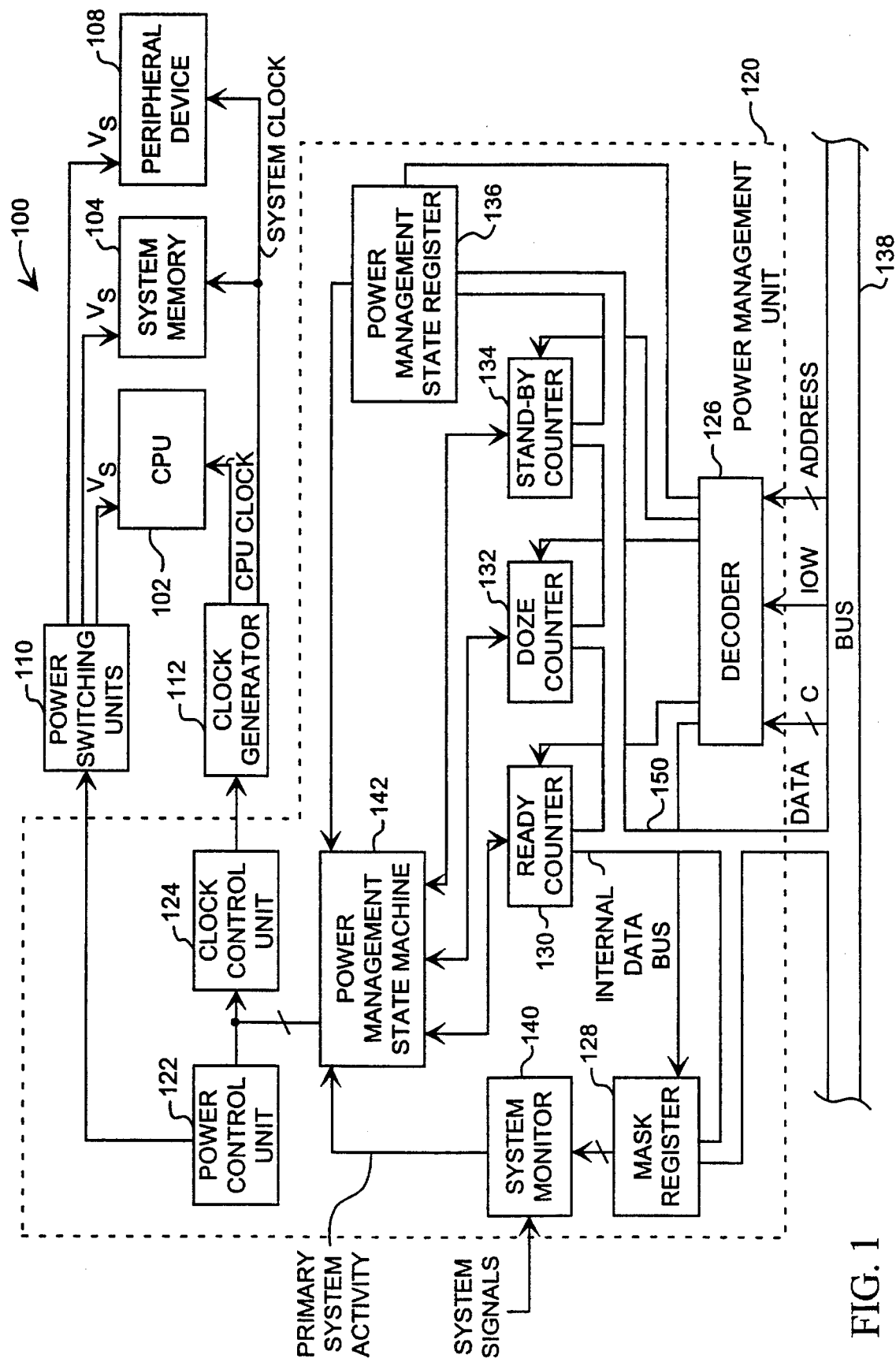
FIG. 1 is a block diagram of a computer system including a power management unit according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 including a power management unit in accordance with the present invention. As depicted within the figure, computer system 100 includes a microprocessor (CPU) 102, a system memory 104, and a peripheral device 108. Computer system 100 further includes a power switching unit 110, a clock generator 112, and a power management unit 120.

Microprocessor 102 is exemplary of, for example, a model 80486 microprocessor. Clock generator 112 generates a CPU clock signal and a system clock signal, and power switching unit 110 provides power to the various components of the computer system. Peripheral device 108 is illustrative of, for example, a variety of peripheral devices such as a keyboard, a printer, and a modem.

Power management unit 120 includes a power control unit 122 coupled to power switching unit 110, and a clock control unit 124 coupled to clock generator 112. Power management unit 120 further includes a decoder 126, a mask register 128, a ready counter 130, a doze counter 132, a stand-by counter 134, and a power management state register 136 coupled to a bus 138. Power management unit 120 finally includes a system monitor 140 coupled to mask register 128, and a power management state machine 142 coupled to power control unit 122 and clock control unit 124.

The power management unit 120 is provided to regulate and minimize the power consumed by computer system 100. For the embodiment of FIG. 1, power switching unit 110 is controlled to selectively provide power to microprocessor 102, system memory 104, and peripheral device 108 depending upon the state of power management unit 120. Clock generator 112 is similarly controlled such that the frequencies of the CPU clock signal and the system clock signal are varied depending upon the state of power management unit 120, as will be described in greater detail below.

Figure 2:
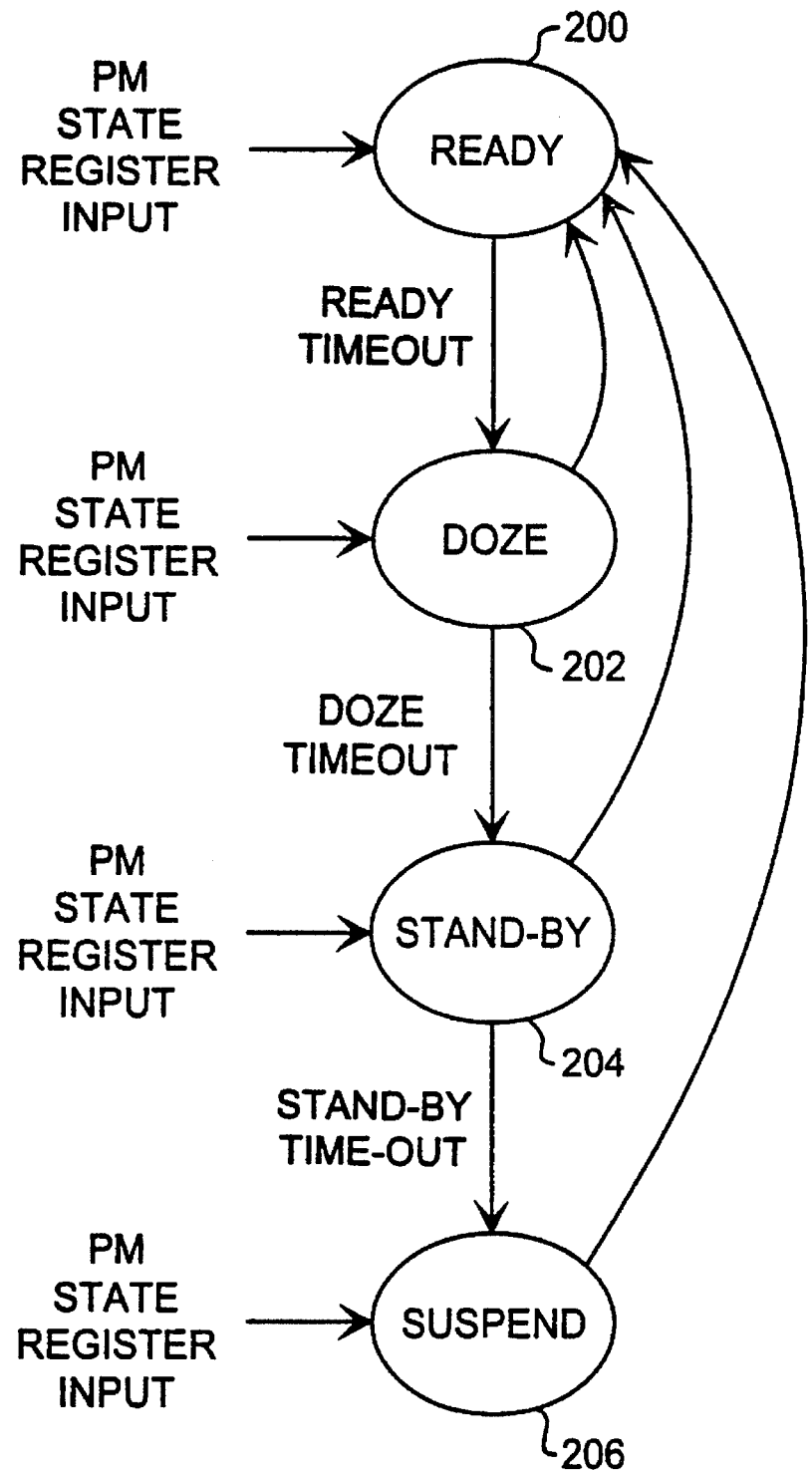
FIG. 2 is a state diagram that illustrates a ready state, a doze state, a standby state, and a suspend state of the power management unit.

Power control unit 122 and clock control unit 124 control the power switching unit 110 and clock generator 112, respectively, depending upon the internal state of power management state machine 142. FIG. 2 is a state diagram that illustrates several internal states of power management state machine 142. Specifically, power management state machine 142 includes a ready state 200, a doze state 202, a stand-by state 204, and a suspend state 206. During ready state 200, computer system 100 is considered full-on. All components of the computer system 100 are clocked at full speed and are powered-on. The power management state machine 142 enters the ready state 200 upon power-up of the computer system and upon reset. The power management state machine 142 also enters the ready state 200 when primary system activity is detected by system monitor 140 or in response to software writing of a ready state value into power management state register 136, as will be described below.

Power management state machine 142 transitions from the ready state 200 to the doze state 202 if the computer system 100 is idle for a programmable amount of time (0.125 seconds to 16 seconds) as determined by ready counter 130 and system monitor 140. The power management state machine 142 can alternatively enter doze state 202 via software writing of a doze state value into power management state register 136. During doze state 202, clock control unit 124 controls clock generator 112 such that the CPU clock signal is slowed down to a preprogrammed frequency. It is noted that during doze state 202, the system clock signal continues to be driven at maximum frequency and all components are powered-on.

The power management state machine 142 transitions from the doze state 202 to the stand-by state 204 if the system is idle for a programmable amount of time (1 minute to 16 minutes) without any primary activities occurring, as determined by doze counter 132 and system monitor 140. The power management state machine 142 can alternatively enter the stand-by state 204 via software writing to power management state register 136. During the stand-by state 204, power control unit 122 causes the power switching unit 110 to remove power from peripheral device 108. In addition, during stand-by state 204, clock control unit 124 causes the clock generator 112 to turn-off the CPU clock signal. The system clock signal continues to be driven at maximum frequency.

The power management state machine 142 transitions to the suspend state 206 from the stand-by state 204 if the system is idle for a programmable amount of time (5 minutes to 60 minutes) without any primary activities occurring, as determined by stand-by counter 134 and system monitor 140. Power management state machine 142 may alternatively enter the suspend state 206 via software writing of a suspend state value into power management state register 136. When power management state machine 142 is in the suspend state 206, power control unit 122 causes power switching unit 110 to remove power from peripheral device 108, and clock control unit 124 causes clock generator 112 to stop both the CPU clock signal and the system clock signal. Depending upon the system, the power control unit 122 may further cause power switching unit 110 to remove power from microprocessor 102 and system memory 104.

Decoder 126 is provided for decoding I/O write cycles executed on bus 138 by, for example, microprocessor 102. During such I/O write cycles, mask register 128, ready counter 130, doze counter 132, stand-by counter 134, and power management state register 136 may be loaded with various data that controls the power management unit 120.

Data is provided to the mask register 128, ready counter 130, doze counter 132, stand-by counter 134, and power management state register 136 from bus 138 via internal data bus 150. It is noted that bus 138 may be coupled to microprocessor 102 directly or through a bus bridge.

System monitor 140 monitors the microprocessor 102, system memory 104, and other system components to determine whether certain primary activity is occurring. For example, system monitor 140 may monitor the CPU local bus to determine whether certain cycles are currently being executed. System monitor 140 may similarly monitor various interrupt signals to determine the initiation of primary system activity. An exemplary system monitor that determines whether various components of a computer system are currently active is described within U.S. Pat. No. 5,167,024 issued Nov. 24, 1992 to Smith, et al. This patent is incorporated herein by reference in its entirety.

If system monitor 140 detects primary system activity, a signal labelled "Primary System Activity" is provided to power management state machine 142. Mask register 128 allows the programmer to mask certain activities that are normally detected by system monitor 140. For example, the system programmer may desire to prevent activities of a video monitor from being considered "primary activity" by system monitor 140. Accordingly, the mask register 128 may be set such that activities of the video monitor are ignored.

As stated previously, power management state register 136 may be software programmed with one of several predetermined state values that controls the current state of power management state machine 142. A particular state value is written into power management state register 136 by executing an I/O write cycle on bus 138. Power management state register 136 thus accommodates Advanced Power Management (APM) software.

Ready counter 130, doze counter 132, and stand-by counter 134 are configured within the system to protect against misbehaved software that does not operate according to, for example, the Advanced Power Management software standard. During operation, the ready counter 130 is loaded with a value that causes the ready counter 130 to count a period of time from 0.125 seconds to 16 seconds. As stated previously, upon lapse of this programmable amount of time, the power management state machine 142 makes the transition from the ready state 200 to the doze state 202 if primary system activity is not detected by system monitor 140. Similarly, doze counter 132 may be loaded with a value that causes the doze counter 132 to count for a programmable amount of time from 1 minute to 16 minutes. Doze counter 132 controls the doze time-out period which causes power management state machine 142 to transition from doze state 202 to stand-by state 204 if primary system activity is not detected by system monitor 140. Finally, stand-by counter 134 may be loaded with a value that causes stand-by counter 134 to count a programmable amount of time from 5 minutes to 60 minutes. The stand-by counter 134 controls the time-out period which causes the power management state machine 142 to transition from stand-by state 204 to suspend state 206 if primary activity is not detected by system monitor 140. The power management state machine 142 remains in suspend state 206 until primary system activity is detected by system monitor 140 or until the power management state register 136 is software written with a new state value. Primary system activity that causes power management state machine 142 to transition from suspend state 206 to ready state 200 may be, for example, the detection of a keyboard entry. It is noted that the ready counter 130, the doze counter 132, and the stand-by counter 134 are each reset when primary system activity is detected by system monitor 140.

In accordance with the power management unit 120 described above, Advanced Power Management software may be employed to control the state of the power management unit 120 via software I/O writes to power management state register 136. The power management unit 120 protects against misbehaved software by providing ready counter 130, doze counter 132, and stand-by counter 134. If primary activity is undetected for an amount of time programmed within the various counters, the power management state machine 142 successively enters several power reducing states during which the power to various components of the computer system may be removed and during which the frequencies of the CPU clock signal and the system clock signal may be reduced (or stopped). Thus, the power consumed by the computer system 100 is reduced even if software that is incognizant of the Advanced Power Management software standard is employed.

It is noted that the power management state machine 142 may employ power reducing states other than those illustrated within FIG. 2, and that the number of programmable counters (i.e., ready counter 130, doze counter 132, stand-by counter 134) may be varied accordingly. In one embodiment, the power management state machine 142 controls only the frequencies of the CPU clock signal and the system clock signal, and does not control the application and removal of power from various components of the computer system.

It is further noted that system activities that are considered primary activities as detected by system monitor 140 may vary from system to system. Such primary activities may be similarly programmable by the user. In one embodiment, system monitor 140 detects and defines parallel port activity, serial port activity, hard disk activity, floppy disk activity, and coprocessor activity as primary activities. Memory cycles to system memory 104, keyboard activity, video activity, bus request activity, and non-maskable interrupt activity may further be defined as primary activity. As stated previously, primary activity causes the power management state machine to revert back to the ready state 200 and resets the ready counter 130, the doze counter 132, and the stand-by counter 134.

Computer aided design tools may be employed to reduce the power management state machine 142 described above to a sequential logic control circuit. Exemplary computer-aided design tools include the VHSIC hardware description language and the Verilog description language.

A computer system that employs the power management unit having a software configurable state register and time-out counters as described above may further employ the circuitry and techniques described within the copending, commonly assigned patent applications: "Periodic System Management Interrupt Source and Power Management System Employing the Same", by Wisor, et al , Ser. No. 08/190,597, filed concurrently herewith; "Immediate System Management Interrupt Source with Associated Reason Register", by Wisor, et al., Ser. No. 08/190,285, filed concurrently herewith; "Power Management System For an Integrated Processor", by O'Brien, et al., Ser. No. 08/190,292, filed concurrently herewith; and "Power Management Message Bus For Integrated Processor", by Gephardt, et al., Ser. No. 08/190,280, filed concurrently herewith. These copending, commonly assigned patent applications are incorporated herein by reference in their entirety.

Numerous variations and modifications will become apparent to those skilled in the art once the above disclosure is fully appreciated. For example, power management state register 136 may be incorporated as an integral part of power management state machine 142. It is intended that the following claims be interpreted to embrace all such variations and modifications.

What is claimed is:

1. A power management system for a computer system comprising:

a clock control unit for controlling the frequency of a first clock signal;

a power management state machine coupled to said clock control unit, wherein said power management state machine includes a normal state during which said clock control unit causes said first clock signal to be driven at a first frequency and a doze state during which said clock control unit causes said first clock signal to be driven at a reduced frequency;

a software programmable register coupled to said power management state machine and configured to receive a first value that causes said power management state machine to transition from said normal state to said doze state and further configured to receive a second value that causes said power management state machine to transition from said doze state to said normal state;

a system monitor coupled to said power management state machine and configured to detect a predetermined system activity; and a first counter coupled to said power management state machine and configured to cause said power management state machine to transition from said normal state to said doze state upon lapse of a first predetermined count period, wherein said power management state machine is configured such that a transition from said normal state to said doze state is invoked if said predetermined system activity is not detected by said system monitor during said first predetermined count period regardless of a value stored within said software programmable register.

2. The power management system as recited in claim 1 wherein said power management state machine transitions to said normal state if said predetermined system activity is detected by said system monitor.

3. The power management system as recited in claim 1 wherein said first counter is programmable.

4. The power management system as recited in claim 1 wherein said first clock signal is a CPU clock signal.

5. The power management system as recited in claim 4 further comprising:

a second counter coupled to said power management state machine;

wherein said power management state machine further includes a stand-by state during which said clock control unit causes said CPU clock signal to be stopped, and wherein said second counter is configured to cause said power management unit to switch from said doze state to said stand-by state upon lapse of a second predetermined count period.

6. The power management system as recited in claim 5 further comprising:

a third counter coupled to said power management state machine;

wherein said power management state machine further includes a suspend state during which said clock control unit causes said CPU clock signal to be stopped and causes a system clock signal to be stopped, and wherein said third counter is capable of causing said power management state machine to switch from said stand-by state to said suspend state upon lapse of a third predetermined count period.

7. The power management system as recited in claim 6 further comprising a power control unit coupled to said power management state machine, wherein said power control unit is configured to cause power to be removed from a peripheral device when said power management state machine is in said suspend state.

8. The power management system as recited in claim 1 further comprising a mask register coupled to said system monitor, wherein said mask register is configured to store a value for masking selected activities that are monitored by said system monitor.

9. A power management system for a computer system comprising:

a clock control unit for controlling the frequency of a first clock signal, wherein said first clock signal is for clocking a processor;

a power management state machine coupled to said clock control unit, wherein said power management state machine includes a normal state during which said clock control unit causes said first clock signal to be driven at a first frequency and a doze state during which said clock control unit causes said first clock signal to be driven at a reduced frequency;

a software programmable register coupled to said power management state machine and configured to receive a first value that causes said power management state machine to transition from said normal state to said doze state and to receive a second value that causes said power management state machine to transition from said doze state to said normal state;

a system monitor coupled to said power management state machine and configured to detect a predetermined system activity; and a first programmable counter coupled to said power management state machine and configured to cause said power management state machine to transition from said normal state to said doze state upon lapse of a first predetermined count period; and a system monitor coupled to said power management state machine for detecting activity of said computer system, wherein said power management state machine switches from said normal state to said doze state upon lapse of said predetermined count period if said system monitor does not detect said predetermined system activity, wherein said power management state machine is configured such that a transition from said normal state to said doze state is invoked if said predetermined system activity is not detected by said system monitor during said first predetermined count period regardless of a value stored within said software programmable register.

10. The power management system as recited in claim 9 wherein said power management state machine transitions to said normal state if said predetermined system activity is detected by said system monitor.

11. The power management system as recited in claim 10 further comprising:

a second counter coupled to said power management state machine;

wherein said power management state machine further includes a stand-by state during which said clock control unit causes said CPU clock signal to be stopped, and wherein said second counter is configured to cause said power management unit to switch from said doze state to said stand-by state upon lapse of a second predetermined count period.

12. The power management system as recited in claim 11 further comprising:

a third counter coupled to said power management state machine;

wherein said power management state machine further includes a suspend state during which said clock control unit causes said CPU clock signal to be stopped and causes a system clock signal to be stopped, and wherein said third counter is configured to cause said power management state machine to switch from said stand-by state to said suspend state upon lapse of a third predetermined count period.

13. The power management system as recited in claim 12 further comprising a power control unit coupled to said power management state machine, wherein said power control unit is configured to cause power to be removed from a peripheral device when said power management state machine is in said suspend state.

14. The power management system as recited in claim 10 further comprising a mask register coupled to said system monitor, wherein said mask register is configured to store a value for masking selected activities that are monitored by said system monitor.

* * * * *